(12) United States Patent
Novak et al.

(10) Patent No.: US 7,209,638 B1
(45) Date of Patent: *Apr. 24, 2007

(54) UNIFORM MEMORY MANAGEMENT FOR PERSONAL DEVICES WITH NON-UNIFORM MEMORY SYSTEMS

(75) Inventors: Robert E. Novak, Santa Clara, CA (US); Michael E. Sears, Los Altos, CA (US)

(73) Assignee: Melodeo, Inc., Seattle, WA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 10/348,218

(22) Filed: Jan. 21, 2003

Related U.S. Application Data

(60) Provisional application No. 60/350,905, filed on Jan. 23, 2002.

(51) Int. Cl.
*H04N 5/76* (2006.01)
(52) U.S. Cl. .......................................... 386/69; 386/70
(58) Field of Classification Search ............. 386/69–70
See application file for complete search history.

(56) References Cited

U.S. PATENT DOCUMENTS 7,016,418 B2 * 3/2006 Wang et al. ............ 375/240.24
7,120,734 B2 * 10/2006 Ogino ........................ 711/111
7,126,770 B1 * 10/2006 Arai et al. ...................... 360/8

OTHER PUBLICATIONS

Open-source audio wins MP3 player support, c/net NEWS.COM, Feb. 24, 2003, pp. 1-2. Retrieved from the internet:: <URL:http//www.CNETnews.com.html>.
Wired News: A TiVo Player for the Radio, May 12, 2003, pp. 1-3. Retrieved from the internet: <URL :http//www.wired.com/news/print/0.1282.58769.00.html.

* cited by examiner

*Primary Examiner*—Thai Q. Tran
*Assistant Examiner*—Nigar Chowdhury
(74) *Attorney, Agent, or Firm*—Black Lowe & Graham PLLC

(57) ABSTRACT

The disclosure deals with the management of data in the memory of a digital media playback device. Specifically this invention deals with the mechanisms to allow memory to be treated as a uniform resource, regardless of the physical implementation of the data storage in the playback device. Manage the memory on a digital media player as logical partitions, not just physical partitions between different types of memory. This will treat the entire memory space as a uniform piece of memory, regardless of whether the memory is internal memory with battery backup, Flash memory that behaves like a logical disk, rotating media that is read/write (typically magnetic disk or CD-RW or DVD-RW) or rotating media that is read only.

24 Claims, 2 Drawing Sheets

| Group | Type | Location | Installation | Persistence | Class |
|---|---|---|---|---|---|
| 1 | R/W | Local | WIRED | Ephemeral | RAM |
| 2 | R/O | Local | WIRED | Permanent | ROM |
| 3 | R/W | Local | WIRED | Semi | FLASH |
| 4 | R/W | Local | Slot | Semi | FLASH |
| 5 | R/O | Local | Disc | Semi | CD-ROM |
| 6 | R/W | Local | Disc | Volatile | Magnetic Disk |
| 7 | R/W | Network | Network | Volatile | Magnetic Disk |
| 8 | R/O | Network | Network | Semi | Web Server |

UNIFORM MEMORY MANAGEMENT FOR PERSONAL DEVICES WITH NON-UNIFORM MEMORY SYSTEMS

RELATED APPLICATIONS

The present application claims the benefit of U.S. provisional patent application No. 60/350,905, entitled "Uniform Memory Management for Personal Devices with Non-Uniform Memory Systems," filed Jan. 23, 2002 by inventors Robert E. Novak and Michael E. Sears. That provisional application is hereby incorporated by reference for all purposes.

TECHNICAL FIELD

This disclosure relates generally to electronics and communications, and more particularly to interactive radio and digital media playback systems.

BACKGROUND

A digital media playback device typically includes a handheld device such as an MP3 player. Some MP3 players are implemented as software programs on Personal Computers. Handheld MP3 players have limited memory sizes that can consist of Flash Memory, dynamic RAM memory and rotating CD-ROM memory. However, these types of MP3 players have required that the user/consumer must manage the memory content (also known as playlists) on the MP3 Player.

This manual management of the memory content has restricted the use of these devices only to users/consumers that are computer literate and are able to manage the storage on the various types of memory in the MP3 device. For example in typical MP3 players there may be 'internal memory' that is built-in to the device when it is manufactured and Flash Memory (sometimes in the form of Smart Media cards) which is inserted into the device by the user/consumer after a separate purchase. The user/consumer must be cognizant of the various types of memory in the device and the limitations of the capacity of the devices. Thus, it would be desirable to eliminate the restrictions inherent in the management of the various types of memory for the user/consumer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
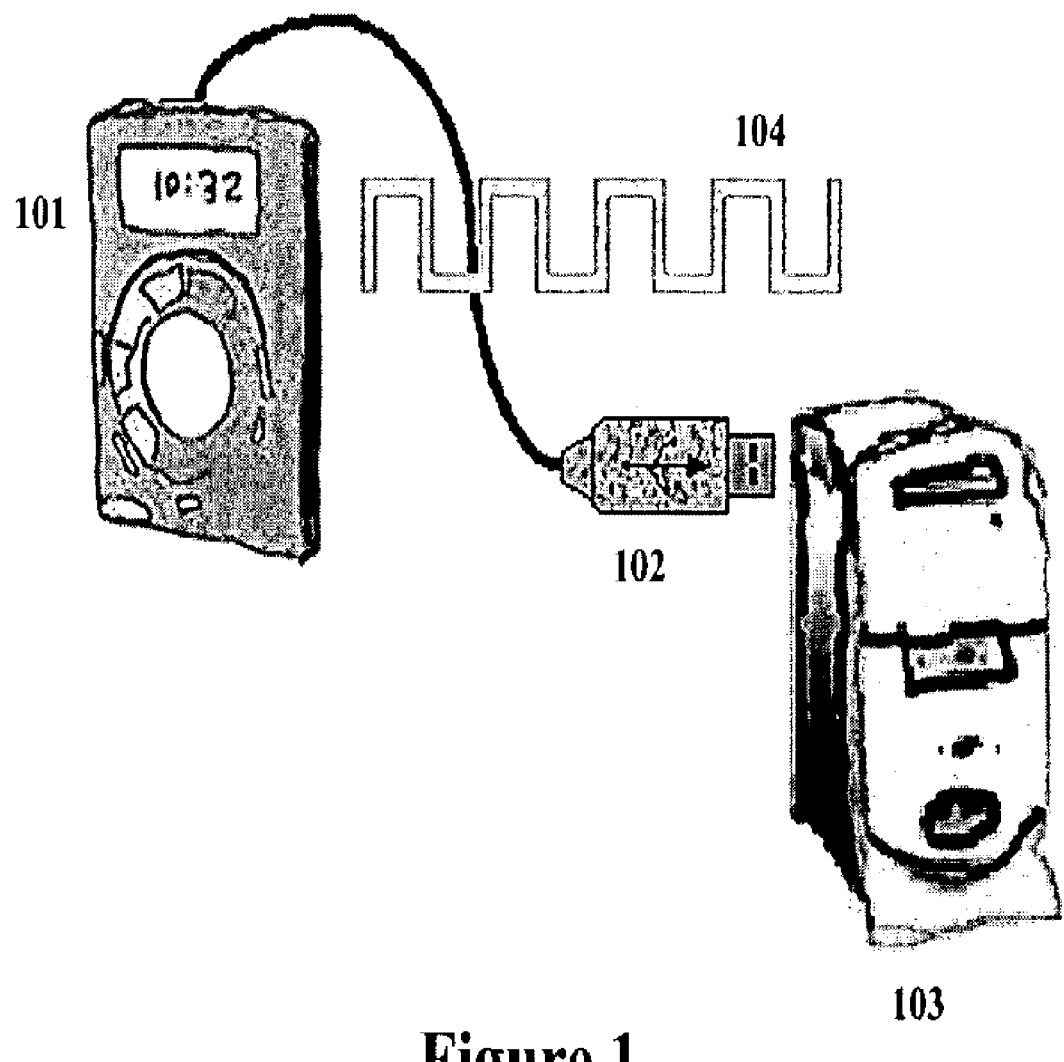
FIG. 1 is a diagram of an MP3 device connected to a personal computer according to one embodiment of the invention.
Figures 2, 3:
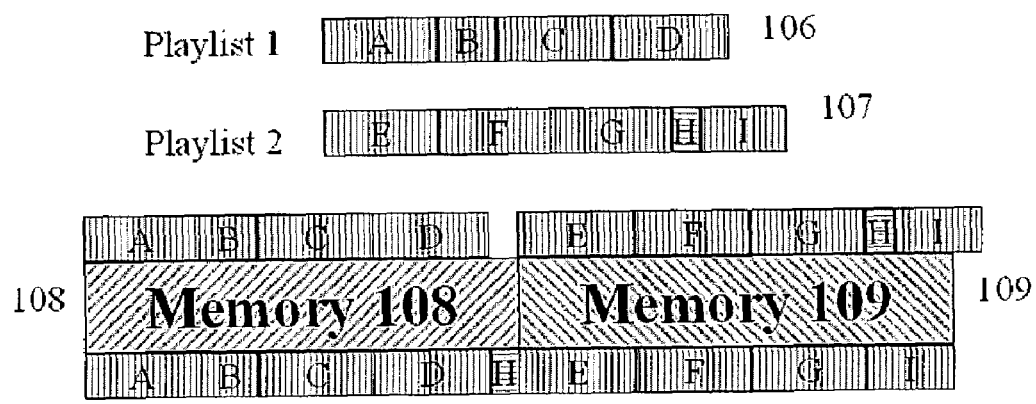
FIG. 2 is a table that describes the types of memory typically communicatively coupled with digital media playback devices according to an embodiment of the invention.
FIG. 3 is a diagram that shows that two consumer/user playlists are re-arranged in their storage order (which does not necessarily represent their playback order) in order to optimize the utilization of memory in a digital media playback device.

Embodiments of an apparatus and/or method for providing automated management of the memory in a digital media playback device are disclosed herein. As an overview, an embodiment of the invention provides an apparatus and method that permit automated management of the various memory types as if they were a uniform memory that is seamless and contiguous.

The following types of logical memory exist for a portable digital media playback device that is sometimes connected to a network or other computer:

1. Read/Write (R/W) local memory—permanently installed—ephemeral storage(SDRAM/RAM)
2. Read-Only (R/O) local memory—permanently installed (ROM)
3. R/W local memory—permanently installed—longer term storage (FLASH)
4. R/W local memory—temporarily installed in a replaceable volume (removable FLASH)
5. R/O rotating memory—temporarily installed in a replaceable volume (CD or DVD)
6. R/W rotating memory—permanently installed—longer term storage (magnetic rotating disc)
7. R/W Network connected memory—via USB or Ethernet—Long term-ephemeral connection
8. R/O Network connected memory—via USB or Ethernet—ephemeral connection A playlist is a list of audio tracks (or other digital media) that are grouped together into a logical collection. A music Compact Disk is an instantiation of a playlist which represents the music publishers organization of the artist(s) music. In one embodiment, an MP3 player (or other Digital Media Player) is connected to a Personal Computer (or other computing device with storage and/or a network connection—such as a Set Top Box) and a user/consumer designates a playlist of the MP3 audio tracks (or other digital media) that are to be placed on the MP3 player. The Personal Computer places all of the audio tracks on the MP3 player without regard to the types of memory within the MP3 player. The user/consumer is not concerned with the different types of memory.

In one embodiment, the user/consumer can select several different playlists that are to be loaded into the digital media player. Each playlist is treated as a sequential list and all of the audio tracks represented by all of the playlist information are loaded into the memory of the digital media playback device (aka digital media player).

In another embodiment, the user/consumer can select several different playlists that are to be loaded into the digital media player. If the total storage required to hold all of the audio tracks is adequate, the sequential placement of the audio tracks may lead to inadequate utilization of the different memory types within the digital media player. As a result, memory may get filled up due to a problem, well known in the art of computer science disk space management, known as 'internal fragmentation' problem. When there are different types of memories or different blocks or segments of memories, inefficient allocation of the memory may lead to a piece of memory unused in one segment, causing overflow into another segment.

In another embodiment, the user/consumer can select several different playlists that are to be loaded in the digital media player. If the total storage required to hold all of the electronic media is inadequate, there are several choices that can be made for the user/consumer in an automated fashion by the application, depending on hints or heuristics that are provided by the user/consumer in the product option selections.

The selections can be organized first by user selected preference criteria to choose the most desirable electronic media selections to be placed in the memory of the digital media player. This preference criteria can be specified in a number of ways. The criteria can be based on weighted averages of multiple criterion. The consumer can specify that the 'fresh' or 'new' media selections are to be given first priority. The consumer can specify that their favorite media selections are to be given second priority. The consumer can then specify that 'older' selections are to be given third priority. The consumer can also designate that certain selections (since the total set of playlists may have been automatically generated) should be given 'lowest' priority and only be loaded in memory on a space available basis.

After the selections which meet the top criteria are organized in a sorted order of priority, the next step is to place those selections in memory in the most efficient way that avoids internal fragmentation and wasted memory space. In some cases, this may require that the 'top' criteria set of selections is further limited.

All of these embodiments are useful for the selection and storage of music media files (such as MP3) on an MP3 digital media playback device such as those manufactured by SONICBLUE or CREATIVE LABS.

However all of these embodiments are fully general to all types of digital media playback devices, including electronic book players, portable DVD players, CD music players, etc.

Once the top selections have been made, the system determines if some form of additional secondary storage (such as CD-R, CD-RW, DVD-R or DVD-RW is available to 'burn' copies of the secondary selections on the appropriate media for loading into the digital media player device. The user is then offered the option to have these secondary selections 'burned' into the secondary storage device to carry with the device either as the single default piece of such secondary media or as a set of such media.

If the secondary media selections already exist on secondary storage devices (such as CD-ROM, Music CD, VCD or DVD), then the consumer may be offered the option to select those titles from their library and carry those pieces of media with them.

In another embodiment, the selections are organized to fit into memory in the media player. For the selections that are not able to fit into one of the memory areas in the media player, the remaining selections can be retained in storage on the host computer that is used to download selections to the media player. In a collaborative effort between the media player and the host computer, the host computer can verify that the media selection(s) are available in memory or on local disk storage on the host computer system of the user/consumer. If so, then these selections will only be accessible when the media playback device is connected to the host computer system by a communicative coupling such as USB, 1394 (AKA Firewire), WiFi network or the communicative coupling.

In the event that the media selections are NOT available on the local disk storage, then the media selections might be placed in storage locations that are accessible only on the Internet/Local Network. In this case, the selections are only available when the digital media player is connected to the host computer system and that the host computer is connected to the storage on the Internet or Local Network.

In another embodiment, additional selections can be made available to the media player without consuming storage on the host computer. Assuming that the communicative coupling between the host computer and the media player is of adequate bandwidth to support the 'streaming' of data from a network connection to the host computer to the media playback device at speeds greater than or equal to the playback speeds required of the media playback device, then the additional selections can be held in storage on the network and never reside in storage in the host computer except as cached information in transit to the media player.

All of the options that require some form of memory optimization (i.e., all of the media selections will not fit sequentially into memory) require that a portion of the memory in the media player device be set aside to form an index of the desired playback order of the media selections. This index is relatively tiny since it consists of simple lists of numbers (indexes) of the playlist entries in the order that they are to be played back.

In the simplest case, it is a simple linear list of the selection #s that refers to the order in which the selections are to be played back, regardless of the order of their storage in one or more memories. In more complex and elaborate mechanisms, the list becomes more complex if we track the separate user-defined playlists, the order of the entries in the playlists, the type of memory in which a selection is stored and the index within that storage region where the selection is found. In reality, this may even take on a multi-tiered approach where the index contains information including a unique hash code of the title, artist and length of the selection in order to help create unique keys which are portable across multiple forms of storage.

What is claimed is:

1. A method of managing separate storage regions in a digital media playback device, the method comprising:
   providing a prioritization of media selections based on user criteria;
   providing an organization of media selections to optimize memory usage in separate storage regions;
   providing an index to media selections which are available via a host computer communicatively coupled to the digital media playback device;
   providing an index to media selections which are available via a network attachments to the host computer which is communicatively coupled to the digital media playback device
   providing a mechanism to automatically index portable rotating media selected from one of music CD, CD-ROM, CD-R, CD-RW, VCD, DVD-R and DVD-RW; and
   providing a mechanism to automatically create portable rotating media selected from one of CD-R, CD-RW, VCD, DVD-R and DVD-RW.

2. The method of claim 1 wherein the portable media is created in response to a selection action by the user.

3. The method of claim 1 wherein the digital media is audio recorded in MP3 format.

4. The method of claim 1 wherein the digital media is audio recorded in WAV format.

5. The method of claim 1 wherein the digital media is audio recorded in Windows Media Format.

6. The method of claim 1 wherein the digital media is an electronic book.

7. The method of claim 1 wherein the digital media is a motion picture recorded in MPEG format on VCD.

8. The method of claim 1 wherein the digital media is a motion picture recorded in MPEG format on DVD.

9. The method of claim 1 where the digital media playback device is an MP3 music player.

10. The method of claim 9 where the MP3 music player has internal memory and insertable memory such as Smart Media or Flash Media memory.

11. The method of claim 9 where the MP3 music player has rotating storage selected from one of (Music CD, CD-ROM, CD-R, CD-RW, VCD, DVD, DVD-R, DVD-R, and Magnetic Disk).

12. The method of claim 11 where the MP3 music player also has internal Flash memory.

13. The method of claim 11 where the MP3 music player also has insertable memory such as Smart Media or Flash Media memory.

14. The method of claim 11 where the MP3 music player also has internal Flash memory and insertable memory such as Smart Media or Flash Media memory.

15. The method of claim 9 where the MP3 music player is communicatively coupled to a host computer system.

16. The method of claim 15 where the host computer system is communicatively coupled to the Internet.

17. The method of claim 1 where the digital media playback device is an electronic book player.

18. The method of claim 17 where the electronic book player has internal memory and insertable memory such as Smart Media or Flash Media Memory.

19. The method of claim 17 where the electronic book player has rotating storage selected from one of player has rotating storage selected from one of (Music CD, CD-ROM, CD-R, CD-RW, VCD, DVD, DVD-R, DVD-R, and Magnetic Disk).

20. The method of claim 19 where the electronic book player also has internal Flash memory.

21. The method of claim 19 were the electronic book player also has internal Flash memory and/or insertable memory such as Smart Media or Flash Media memory.

22. The method of claim 1 where the digital media playback device is a DVD (or other MPEG) motion picture player which player has rotating storage selected from one of (Music CD, CD-ROM, CD-R, CD-RW, VCD, DVD, DVD-R, DVD-R, and Magnetic Disk).

23. The method of claim 22 where the motion picture player has internal memory and insertable memory such as Smart Media or Flash Media Memory.

24. A system for managing separate storage regions in a digital media playback device, the system comprising:

a mechanism to index media selections based on user criteria;

a mechanism to organize media selections to optimize memory usage in separate storage regions;

a mechanism to index media selections which are available via a host computer communicatively coupled to the digital media playback device;

a mechanism to index media selections which are available via a network attachments to the host computer which is communicatively coupled to the digital media playback device;

a mechanism to automatically index portable rotating media selected from one of music CD, CD-ROM, CD-R, CD-RW, VCD, DVD-R and DVD-RW; and a mechanism to automatically create portable rotating media selected from one of CD-R, CD-RW, VCD, DVD-R and DVD-RW.

* * * * *